US009228628B2

(12) United States Patent
Alavandi et al.

(10) Patent No.: US 9,228,628 B2
(45) Date of Patent: Jan. 5, 2016

(54) CRUSH-CAN ATTACHED TO A FRAME RAIL THROUGH A VEHICLE BODY

(71) Applicant: Ford Global Technologies, LLC, Dearborn, MI (US)

(72) Inventors: Bhimaraddi Venkaraddi Alavandi, Canton, MI (US); Sankar Krishnamoorthy, Northville, MI (US); Kevin Gustafson, South Rockwood, MI (US); John Michael McGuckin, Ann Arbor, MI (US); Erika Kristin Low, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 14/054,883

(22) Filed: Oct. 16, 2013

(65) Prior Publication Data

US 2015/0102615 A1 Apr. 16, 2015

(51) Int. Cl.
*B60R 19/00* (2006.01)
*F16F 7/12* (2006.01)
*B62D 21/15* (2006.01)
*B60R 19/34* (2006.01)

(52) U.S. Cl.
CPC . *F16F 7/12* (2013.01); *B60R 19/34* (2013.01); *B62D 21/152* (2013.01)

(58) Field of Classification Search
CPC .......... F16F 7/12; B62D 21/152; B60R 19/34

USPC .......... 293/133, 117, 132, 155, 154; 296/187.09, 187.11
See application file for complete search history.

(56) References Cited

U.S. PATENT DOCUMENTS

| 5,876,078 | A  | * | 3/1999 | Miskech et al. | 293/133 |
| 6,231,095 | B1 | * | 5/2001 | Chou et al. | 293/133 |
| 6,893,203 | B2 | * | 5/2005 | Anderson et al. | 414/557 |
| 6,929,297 | B2 |   | 8/2005 | Muller et al. | |
| 7,044,515 | B2 |   | 5/2006 | Mooijman et al. | |
| 7,484,780 | B2 |   | 2/2009 | Naick et al. | |
| 7,677,617 | B2 |   | 3/2010 | Stewart et al. | |

FOREIGN PATENT DOCUMENTS

EP 1 707 444 10/2006

OTHER PUBLICATIONS

Garret Bautista et al., Best-In-Class Global Bumper Reinforcement Beam, Mechanical Engineering Dept, California Polytechnic State University, San Luis Obispo, 2009, pp. 1-92.

* cited by examiner

*Primary Examiner* — Joseph D Pape
*Assistant Examiner* — Dana Ivey
(74) *Attorney, Agent, or Firm* — Raymond Coppiellie; Brooks Kushman P.C.

(57) ABSTRACT

An impact absorption assembly includes a bumper that is attached to a crush-can. The crush-can is assembled within a frame rail or other chassis frame member. A load path for a low speed impact is provided from the bumper through the crush-can and to the frame rail. An outer body structure defines an opening through which the crush-can is assembled to avoid damage to the outer body structure that may include a back-light support panel, a lift-gate and a rear tail light.

20 Claims, 2 Drawing Sheets

CRUSH-CAN ATTACHED TO A FRAME RAIL THROUGH A VEHICLE BODY

TECHNICAL FIELD

This disclosure relates to low speed rear impact collision force absorption apparatus for mitigating damage.

BACKGROUND

Insurance ratings for a vehicle may be based, in part, on the extent of damage, ease of repair of damaged parts, and repair cost of a vehicle in low speed impact events. One such event is the 15 kph, 100° angled, 40% offset, rigid barrier impact to the rear of the vehicle. In this impact mode, damage to the frame rail, back-light panels, rear floor panel, lift-gate, or deck-lid is undesirable. All these parts are welded together in a uni-body vehicle structure. Repair of these parts involves expensive procedures and may result in unfavorable insurance ratings. Unfavorable insurance ratings are a disadvantage when selling vehicles to customers. It is desirable to contain the damage only to fascia and bumper system assembly that can easily be unbolted from the main vehicle body and replaced after appropriate repairs.

Conventional bumper systems may include a bumper beam with reinforcements, the crush-cans (welded to the bumper beam), and the mounting plate (welded to the crush-can and bolted to the vehicle body). When the bumper system is damaged in a low speed impact, the bumper system is unbolted at the mounting plate and is bolted back on the vehicle after repair.

In a conventional bumper system, the crush-can and bumper beam are designed to avoid damage to the frame rail by avoiding the transfer of high loads to the frame rail. Frame rail damage is avoided by attaching a rail collar reinforcement around the frame rail. Crush space provided by the crush-cans is intended to limit the extent of damage to rear vehicle structures such as a lift-gate or deck-lid. A mounting plate is provided to secure the crush-cans to the frame rail to limit excessive displacement that may be caused by the in-coming barrier. The mounting plate is required to be relatively stiff to avoid deformation of the mounting plate that otherwise may result in damaging the back-light panels and the rear floor pan. Reinforcements are required inside the back-light structure to avoid damage to the back-light. A mounting plate, rail-collar reinforcement, and backlight reinforcement structure are necessary features in conventional bumper systems.

Large vehicles and SUVs frequently include an optional trailer-hitch for towing. The trailer-hitch system is bolted directly to the rails instead of attaching to the bumper system. Bolt access holes and additional reinforcements to the frame rail are required to accommodate the optional trailer hitch system.

Substantial weight savings may be achieved by eliminating the mounting plate, the frame rail-collar, the reinforcement to the lower back-light structure, and the additional reinforcement to the rail for the trailer-hitch system. It would also be advantageous to have a single design for the frame rail for vehicles that either include or do not include the optional towing package.

The above problems and other problems are addressed by this disclosure as summarized below.

SUMMARY

According to one aspect of this disclosure, an impact absorption assembly is provided for a vehicle having an outer body structure that is supported on a frame rail. A bumper is provided on the opposite side of the outer body structure from the frame rail. A crush-can is attached to the bumper and the frame rail. The outer body structure defines an opening that receives the crush-can. The crush-can extends through the opening but is unattached to the outer body structure.

According to other aspects of this disclosure, the crush-can may be directly attached to the frame rail. The frame rail defines an end opening and the crush-can may be received within the end opening. The crush-can may be attached to the frame rail with removable fasteners that may be removed to replace the bumper and the crush-can.

The outer body structure may be a lift-gate that at least partially defines the opening. Another example of the outer body structure may be a rear tail light assembly that at least partially defines the opening.

The crush-can may be shaped to conform to an inner surface of the frame rail and may be telescopically compressed into the frame rail in a rear end collision. The crush-can is designed to be compressed in a rear end collision without deforming the outer body structure defining the clearance space.

According to another aspect of this disclosure, a vehicle including an outer body assembly is provided with a structure for limiting damage to the outer body assembly in a collision. The structure includes a bumper, a chassis frame member supporting the outer body assembly, and a crush-can. The crush-can is secured on a first end to the bumper and on a second end to the chassis frame member. The crush-can extends through an opening defined by the outer body assembly without being fixed to the outer body assembly.

According to other aspects of this disclosure, the chassis frame member may be a longitudinally extending frame rail that defines an end opening, and the crush-can may be directly attached to an inside surface of the frame rail within the end opening. The crush-can may be partially received in the end opening in an as assembled condition and may be telescopically and partially compressed into the opening defined by the frame rail in a post-collision condition.

The crush-can may be attached to the chassis frame member with fasteners that may be removed to replace the bumper and the crush-can.

The body of the vehicle may include a lift-gate that at least partially defines the clearance opening or may include a rear tail light assembly that at least partially defines the opening.

According to one aspect of this disclosure, a load path may be provided for a rear end collision that directs a force of an impact with the bumper to be transferred to the crush-can and the chassis frame member to minimize transferring the force to the outer body assembly.

The above aspects of this disclosure are described below in greater detail and with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
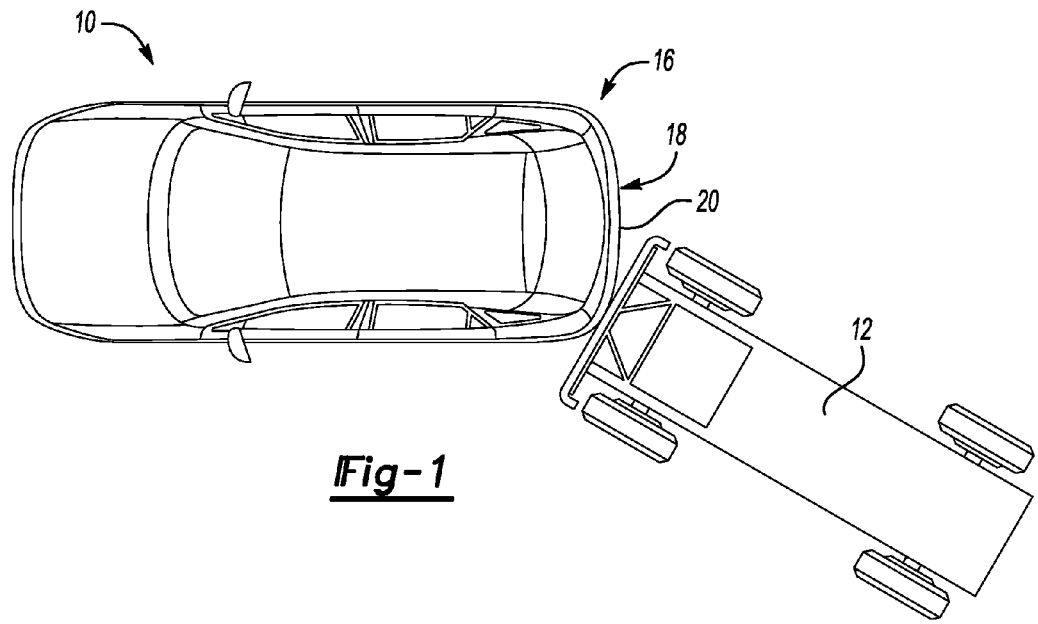
FIG. 1 is a top plan view of a test vehicle in a test for a low speed vehicle impact to the rear end of the test vehicle.

Referring to FIG. 1, a vehicle 10 is illustrated that is being tested in a low speed rear impact test. A test vehicle apparatus 12 is shown engaging the rear bumper of the vehicle 10. The test simulates a rear end collision at 15 kilometers per hour in a 10° angled impact that is 40% offset from the centerline of the vehicle. Based upon this test, an assessment is made as to the extent of damage to the frame rail, back-light panels, rear floor panel, deck lid or lift gate. These parts may be welded together in a uni-body structure and repair of these parts may involve expensive procedures. The rear end 16 of the vehicle 10 is provided with an impact absorption assembly 18 that includes a bumper 20.

Figure 2:
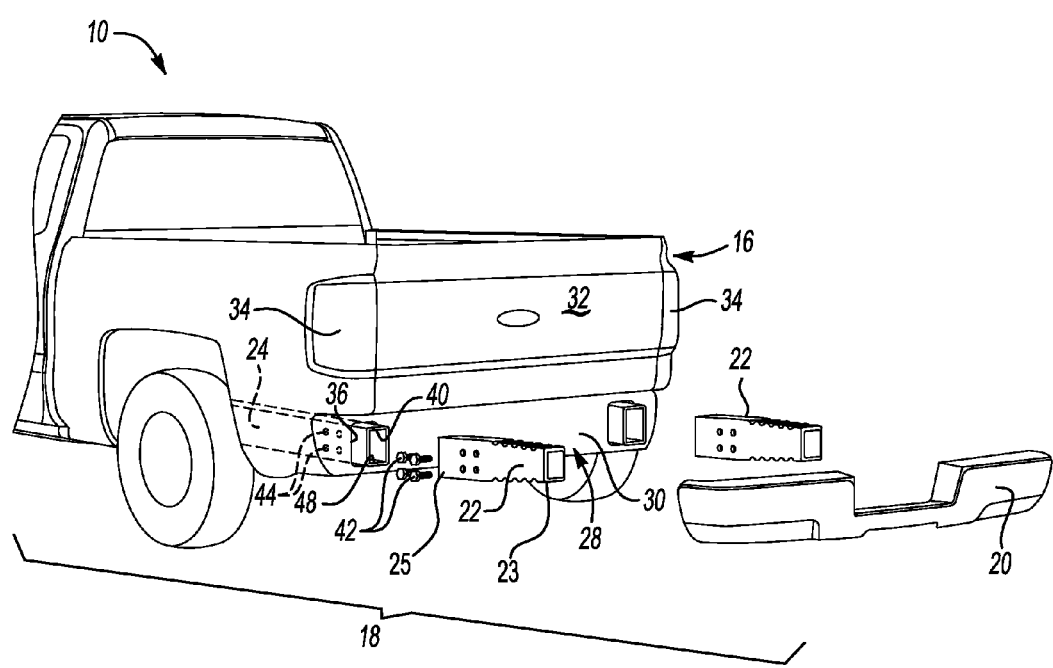
FIG. 2 is an exploded perspective view of a rear end area of a vehicle including a bumper, a crush-can, and a frame rail.

Referring to FIG. 2, the rear end 16 of the vehicle 10 is illustrated with the impact absorption assembly 18 shown in an exploded perspective view. The impact absorption assembly includes the bumper 20 that is connected to a crush-can 22. The crush-can 22 is connected on its outer end 23 to the bumper 20 and at its inner end 25 to a frame rail 24. The frame rail 24 may also be referred to as a chassis frame member.

An outer body structure 28, or outer body assembly, of the vehicle 10 is shown to include a backlight support panel 30, or fascia, below a lift-gate 32. In a sedan or coupe-style vehicle, a deck lid (not shown) is normally provided instead of a lift-gate 32. A rear tail light 34 may also comprise part of the outer body structure 28. The outer body structures 28 define an opening 36. The crush-can 22 is received in the opening 36 in the outer body structure 28.

The frame rail 24 defines an end opening 40. The crush-can 22 is assembled inside the end opening 40 in the frame rail 24. Threaded fasteners 42 are inserted into holes 44 formed in the frame rail 24 and crush-can 22. The holes 44 may be provided with weld nuts to facilitate assembly of the crush-can 22. The threaded fasteners 42 are inserted into the holes 44 and tightened against the weld nuts. The crush-can 22 is shaped to conform to the inner surface 48 of the frame rail 24 adjacent the end opening 40.

Figure 3:
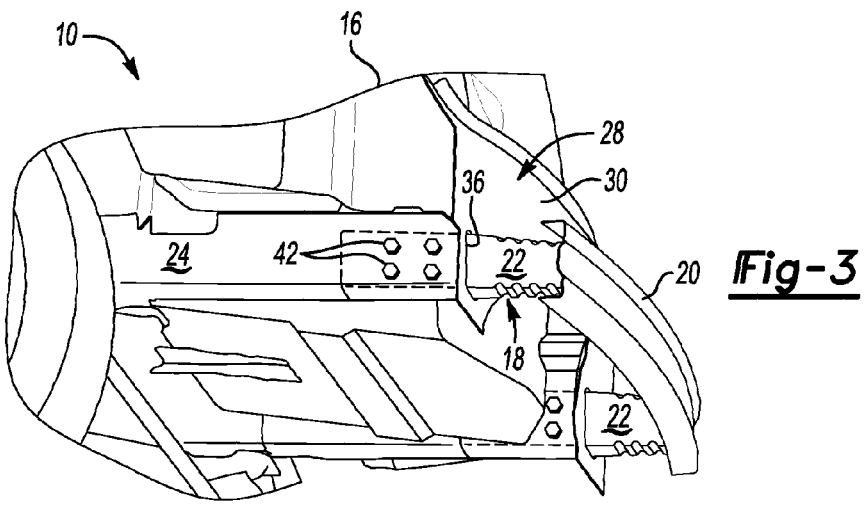
FIG. 3 is a fragmentary perspective view of a rear end area of a vehicle including a bumper, a crush-can, and a frame rail.
Figure 4:
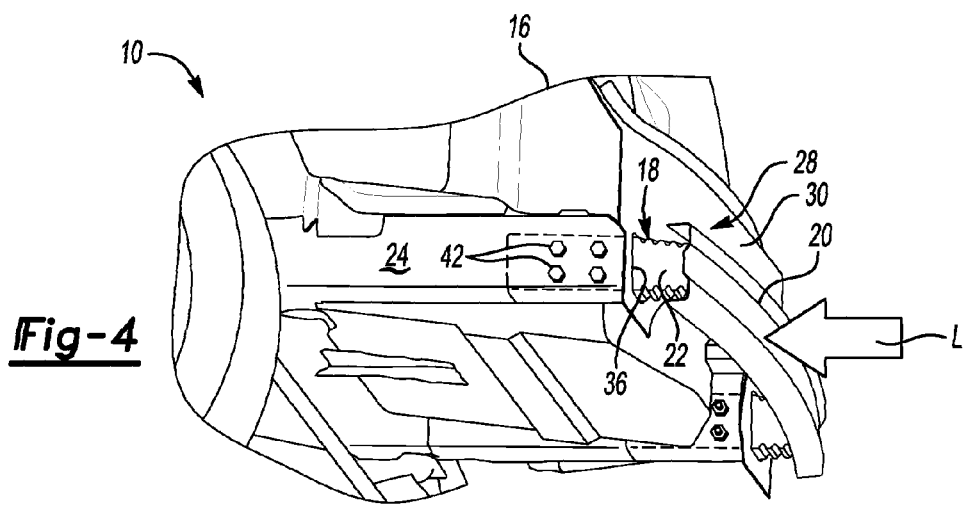
FIG. 4 is a fragmentary perspective view similar to FIG. 3 showing the result of an impact to the bumper that causes the crush-can to be telescopically collapsed into the frame rail.

Referring to FIGS. 3 and 4, a portion of the vehicle 10 is shown with portions of the outer body structure 28 removed to illustrate the impact absorption assembly 18. In FIG. 3, the impact absorption assembly 18 is shown in its assembled condition. In FIG. 4, the impact absorption assembly 18 is shown in a rear end collision with an impact load being applied to the rear bumper, as indicated by the arrow L.

In FIG. 3, the bumper 20 is shown attached to an outer end of two crush-cans 22. The crush-cans 22 extend through openings 36 in the back-light support panel 30. Crush-cans may also extend through the rear fascia panels of the vehicle 10. The crush-cans are secured within the frame rail 24 by a plurality of fasteners 42.

Referring to FIG. 4, upon application of an impact load as indicated by the arrow L, the bumper is forced toward the frame rail 24 and compresses the crush-cans 22. The crush-cans 22 are retained within the frame rail 24 so that the impact load L is directly transmitted to the frame rail 24. At least some of the sidewalls of the crush-can 24 may be corrugated to assist in deformation during a collision. With the crush-cans 22 being assembled inside the frame rails 24, the outer surfaces of the frame rails 24 are accessible for the attachment of towing accessories and reinforcements. The outer body structure 28 including the back-light support panel 30, lift-gate 32, and rear tail light 34 (shown in FIG. 2) are not included in the load path that is designed to absorb the impact load L.

After a rear end collision, the fasteners 42 may be removed from the frame rail 24 and crush-cans 22 to allow the crush-cans 22 and rear bumper 20 to be easily removed from the vehicle 10. A new bumper assembly including the crush-cans 22 may be simply reinserted into the frame rail and secured by the fasteners 42 greatly simplifying a collision repair in the event of a low speed impact event.

Figure 5:
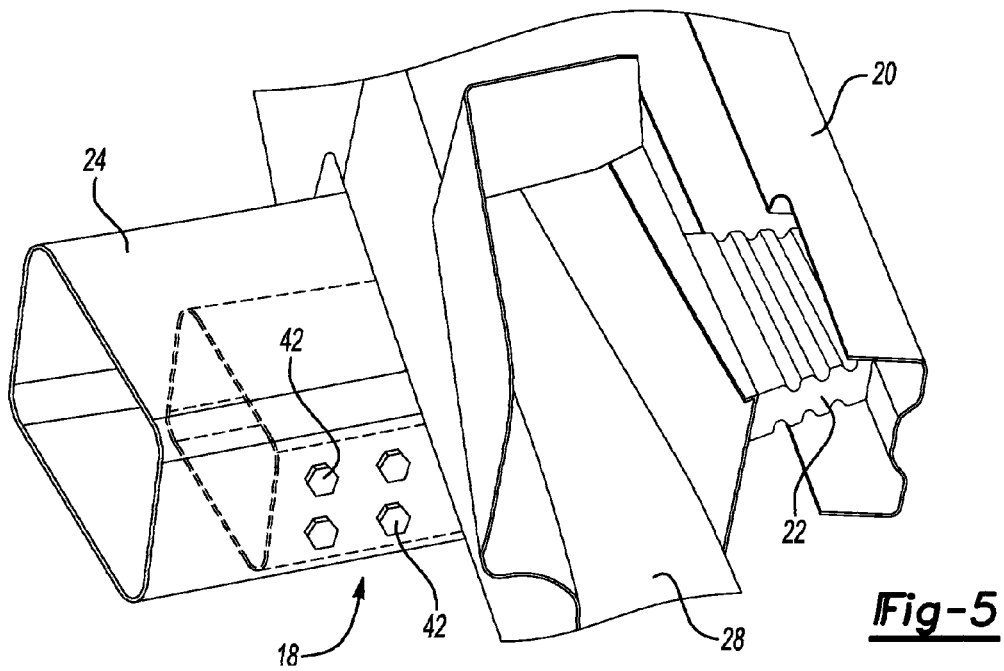
FIG. 5 is a fragmentary perspective view of the bumper, crush-can and frame rail with a rear outer body assembly

Referring to FIG. 5, the impact absorption assembly 18 is illustrated in a magnified view. The impact absorption assembly 18 includes the bumper 20 that is secured to the outer end of a crush-can 22. The crush-can 22 extends through the outer body structure 28, or outer body assembly, and is secured in place within the frame rail 24. Threaded fasteners 42 secure the crush-can 22 within the frame rail 24, as previously described with references to FIGS. 2-4 above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An impact absorption assembly for a vehicle having an outer body structure, the assembly comprising:
   a frame rail;
   a bumper on an opposite side of the outer body structure from the frame rail; and
   a crush-can attached to the bumper and the frame rail, wherein the outer body structure defines an opening, wherein the crush-can extends through the opening, and wherein the crush-can is unattached to the outer body structure.

2. The assembly of claim 1 wherein the crush-can is directly attached to the frame rail via fasteners that extend through the crush-can and frame rail.

3. The assembly of claim 1 wherein the frame rail defines an end opening and the crush-can is received within the end opening.

4. The assembly of claim 3 wherein the crush-can is attached to the frame rail with fasteners that extend through the crush-can and frame rail.

5. The assembly of claim 3 wherein the crush-can is shaped to conform to an inner surface of the frame rail and is telescopically compressed into the frame rail in a rear end collision.

6. The assembly of claim 5 wherein the crush-can is compressed in a rear end collision without contacting the outer body structure.

7. The assembly of claim 1 wherein the outer body structure is a lift-gate that at least partially defines the opening.

8. The assembly of claim 1 wherein the outer body structure is a rear tail light assembly that at least partially defines the opening.

9. The assembly of claim 1 wherein the opening is an aperture extending completely through the outer body structure, and the crush-can extends completely though the aperture.

10. The assembly of claim 1 wherein the crush-can is corrugated to assist in deformation during a collision.

11. A vehicle including an outer body assembly comprising:
- a bumper;
- a chassis frame member supporting the outer body assembly; and
- a crush-can secured on a first end to the bumper and on a second end to the chassis frame member, wherein the outer body assembly defines an opening, and wherein the crush-can extends through the opening without being fixed to the outer body assembly.

12. The vehicle of claim 11 wherein the chassis frame member is a longitudinally extending frame rail that defines an end opening, and wherein the crush-can is directly attached to an inside surface of the frame rail within the end opening.

13. The vehicle of claim 12 wherein the crush-can is partially received in the end opening in an as-assembled condition and is telescopically and partially compressed into the opening defined by the chassis frame member in a post-collision condition.

14. The assembly of claim 11 wherein the crush-can is attached to the chassis frame member with fasteners that extend through the crush-can and chassis frame member.

15. The assembly of claim 11 wherein the body of the vehicle includes a lift-gate that at least partially defines the opening.

16. The assembly of claim 11 wherein the body of the vehicle includes a rear tail light assembly that at least partially defines the opening.

17. The assembly of claim 11 further comprising means for transferring a force of an impact with the bumper to the crush-can and the chassis frame member to minimize transferring the force to the outer body assembly.

18. The assembly of claim 11 wherein the outer body structure is disposed between the first and second ends.

19. The assembly of claim 11 wherein opening is an aperture extending completely through the outer body structure, and the crush-can extends completely though the aperture.

20. The assembly of 11 wherein the crush-can is corrugated to assist in deformation during a collision.

\* \* \* \* \*